United States Patent [19]

Molini et al.

[11] 4,448,024

[45] * May 15, 1984

[54] RECOVERY OF ENTHALPY FROM HOT FLUIDS

[76] Inventors: Alberto E. Molini, Quinta Paso Estrecho, San German, P.R. 00753; Clarence Zener, 3955 Bigelow Blvd., Pittsburgh, Pa. 15213

[*] Notice: The portion of the term of this patent subsequent to Jan. 5, 1999 has been disclaimed.

[21] Appl. No.: 303,385

[22] Filed: Sep. 18, 1981

Related U.S. Application Data

[63] Continuation-in-part of Ser. No. 46,668, Jun. 8, 1979, Pat. No. 4,308,722.

[51] Int. Cl.³ .............................................. F01K 25/06
[52] U.S. Cl. ...................................... 60/649; 60/646; 60/657; 60/673; 415/80
[58] Field of Search .................. 60/642, 646, 649, 657, 60/669, 670, 673; 415/80

[56] References Cited

U.S. PATENT DOCUMENTS

| | | | |
|---|---|---|---|
| 2,151,949 | 3/1939 | Turner | 60/649 |
| 2,190,957 | 2/1940 | Turner | . |
| 2,200,759 | 5/1940 | Turner | . |
| 3,032,988 | 5/1962 | Kleckner | 415/80 X |
| 3,805,515 | 4/1974 | Zener | . |
| 3,879,949 | 4/1975 | Hays et al. | . |
| 3,967,449 | 7/1976 | Beck | 60/641.7 |
| 3,972,195 | 8/1976 | Hays et al. | . |
| 3,995,160 | 11/1976 | Zener et al. | . |
| 3,995,428 | 12/1976 | Roberts | . |
| 4,026,111 | 6/1977 | Matthews | . |
| 4,027,483 | 6/1977 | Wahl | 415/80 X |
| 4,041,708 | 8/1977 | Wolff | 60/649 |
| 4,083,189 | 4/1978 | Fetkovich | . |
| 4,149,385 | 4/1979 | Sheinbaum | . |
| 4,175,381 | 11/1979 | Scragg et al. | . |
| 4,192,145 | 3/1980 | Tanaka | . |
| 4,202,864 | 5/1980 | Spevack | . |
| 4,308,722 | 1/1982 | Molini et al. | 60/646 |

*Primary Examiner*—Allen M. Ostrager
*Assistant Examiner*—Stephen F. Husar
*Attorney, Agent, or Firm*—Buell, Blenko, Ziesenheim & Beck

[57] ABSTRACT

Enthalpy is recovered from hot industrial effluents by converting a working fluid into a foam in a flashing unit and using the foam to propel a turbine located within or at the output of the flashing unit. For liquid effluents the effluent itself serves as the working fluid. For gaseous effluents a liquid is heated by the gas and then the liquid is used as the working fluid. If the effluents contain undesirable levels of pollutants working fluid is cleaned before it is flashed. The specification discloses both impulse and reactive turbines which the foam can propel.

13 Claims, 7 Drawing Figures

RECOVERY OF ENTHALPY FROM HOT FLUIDS

This is a continuation-in-part of our U.S. Patent application Ser. No. 046,668, filed June 8, 1979, now U.S. Pat. No. 4,308,722.

This invention relates to a method and apparatus for producing useful electrical power from hot gaseous or liquid industrial effluents and other hot fluids and simultaneously minimizing their environmental impact. The method and apparatus of the present invention recover as electricity a significant portion of the thermal energy in industrial effluents and concurrently clean and lower the temperature of the industrial effluent.

Present pollution abatement processes do not utilize the enthalpy of the effluents upon which they are used. The method and apparatus of this invention recover much of the effluent's thermal energy in addition to removing pollutants. Consequently, they provide a more economically attractive means of pollution abatement and a more environmentally attractive means of producing electricity.

When used in conjunction with a fossil fuel fired plant the method and apparatus of this invention permit the use of cheaper, lower quality fuels with high sulfur and ash content because pollutants are removed from the hot flue gas, enhance existing pollution control devices, eliminate the need for expensive, lined, tall smoke stacks because the gas emitted into the atmosphere is cleaner and cooler, recover large amounts of thermal energy that would otherwise be lost and can augment the power output of steam electric generating stations by up to 10%.

For gaseous effluents the method and apparatus use well known direct contact scrubbing techniques wherein the gas enters one end of a scrubbing tower and flows toward its opposite end. The scrubbing tower can be a vertical or horizontal type. A liquid containing a scrubbing agent is fed at the top or middle of the tower and falls downward making intimate contact with the moving gas. A suitable scrubbing agent to remove sulfur compounds would be calcium carbonate. As it contacts the gas the liquid is heated and picks up solid particles, sulfur compounds and $NO_x$ compounds from the gas. Cleaned and cooler gas is emitted from the opposite end of the tower and hot pollutant carrying liquid is collected at the tower's base. From there the hot liquid is passed through a cleaning unit to remove the solid abrasive particles that were removed from the hot effluent. Then the hot liquid is fed into a flashing unit where it is transformed into a foam-like mixture. The flashing unit is a chamber in which the exposure of the hot liquid to a vacuum gradient serves to continuously flash the hot liquid thus liberating some of its enthalpy and causing a fraction of it to evaporate. This unit preferably has an internal geometry similar to a convergent-divergent nozzle wherein the liquid flashes throughout its length. The foam-like mixture, hereinafter called foam, is a mixture of vapor and liquid similar to common foam and is formed by the continuous evaporation of a portion of the hot liquid in the flashing unit. The foam is permitted to move through the flashing unit. An impulse turbine placed within or at the output of the unit can be propelled by the moving foam. The foam's movement can also be directed vertically through the flashing unit, separated into its liquid and vapor phase and the liquid used to propel a turbine. Alternatively, one could use a reaction turbine having flashing units about its perimeter. The movement of the foam to higher levels within the unit in essence changes some of the thermal energy of the hot liquid into potential energy of the foam. At the top of the unit the foam is broken into its liquid and vapor components. The liquid portion is guided to a stand-pipe that feeds a hydro-electric turbine generator thus achieving the conversion of some of the thermal energy acquired by the scrubbing fluid from the hot, dirty effluent into potential energy which is finally converted into electric energy. The vapors remaining from the broken foam proceed to a spray condenser where they are condensed and removed from the vacuum apparatus through the barometric leg of the spray condenser, thus maintaining the vacuum of the system.

For hot liquid effluents, the scrubbing step is avoided and the liquid passed directly into a cleaning system where its solid abrasive particulate pollutants are removed. The cleaned hot effluent is fed to the vacuum apparatus as described above where it is likewise flashed. The rapidly generated vapor will also form a vapor-liquid mixture resembling a foam. The operation of the vacuum flashing apparatus will be the same as described above.

If the user encounters a gas or liquid which does not contain an unacceptable level of pollutants the scrubbing step can be eliminated. The gas would heat a working fluid by direct contact or other techniques and then the working fluid would be conducted to the flashing unit. In the other case the liquid encounted by the user would be conducted directly to the flashing unit.

In all embodiments of the invention a liquid is transformed into a foam to permit maximum utilization of the heat energy contained in the liquid. This foam is a mixture of vapor and intermingled liquid in which the overwhelming volume percentage is in the vapor phase and the overwhelming mass percentage is in the liquid phase. In the foam any motion of the vapor phase is accompanied by motion of the liquid phase. Therefore, the height to which the vapor rises causes a corresponding rise of the liquid. The maximum potential and kinetic energy of a foam can be calculated from well known and understood formulas.

The properties of the foam permit a maximum utilization of the enthalpy released during flashing. In a chamber having a pressure differential at opposite ends the vapor component will cause the foam to move from the high pressure area to a low pressure area. If the high pressure area is at the bottom of the chamber, foam generated there will rise to the top. At the top of the chamber the foam can be separated into its liquid and vapor phases. The force of gravity will then cause the liquid to fall. The kinetic energy of the falling liquid can be used by conducting it over a water wheel type turbine connected to a generator. A pressure differential can be maintained in the chamber by keeping the top of it cooler than the hot liquid entering the bottom of the chamber.

Other details, objects and advantages of the invention will become apparent as a description of certain present preferred embodiments of the invention proceeds.

In the accompanying drawings, we have shown certain present preferred embodiments of the invention in which.

Figure 1:
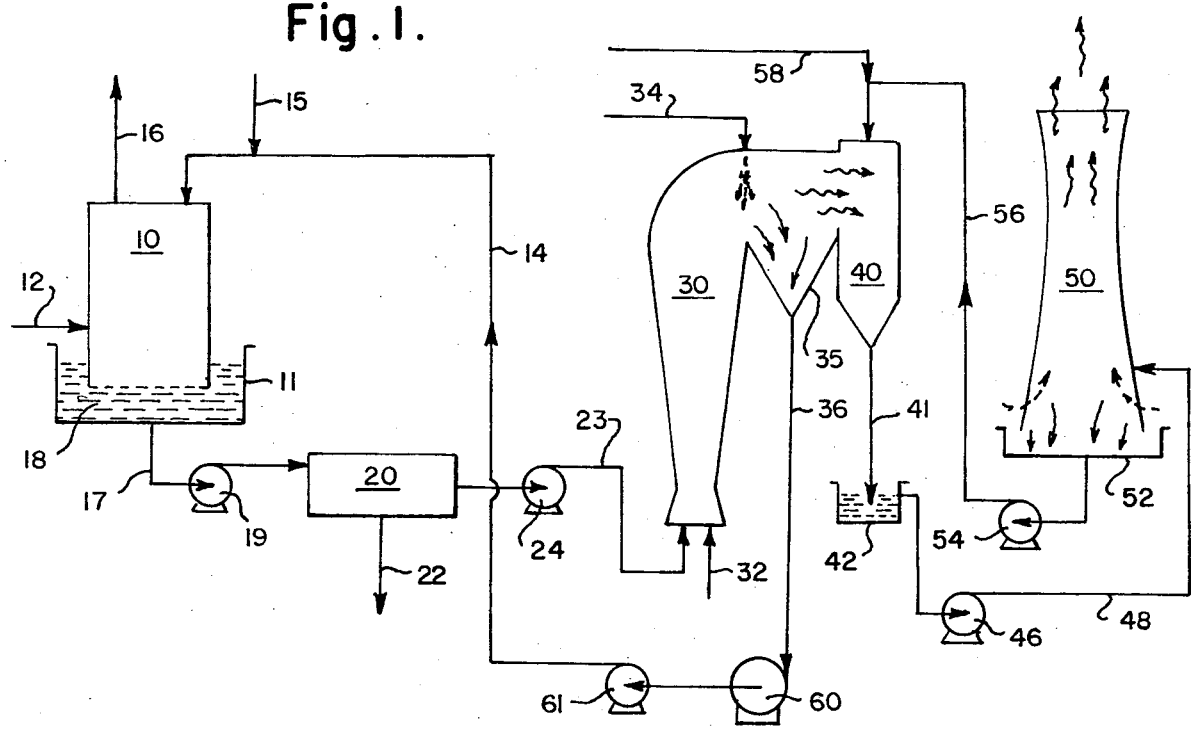
FIG. 1 is a flow diagram showing a present preferred method and apparatus for use with gaseous effluents.

Referring to FIG. 1, hot gaseous industrial effluent is conducted through conduit 12 into the lower portion of a scrubbing tower 10 where it is cleansed of pollutants through contact with a scrubbing fluid which has been fed through conduit 14 into the top of the tower 10. Alternatively, a hot gas may be directed horizontally into the tower 10 and the scrubbing liquid directed vertically downward in tower 10 to maximize the efficiency of the operation. Numerous scrubbing fluids such as water, glycols, and glycerin can be used as the scrubbing fluid. Although water will serve as a suitable scrubbing fluid, higher-boiling organic liquids or silicon oils are preferable because they permit higher energy recovery rates. Whatever fluid is selected it is also necessary to add to it a sulfur trapping agent such as calcium carbonate to enable the fluid to remove the sulfur compounds from the effluent.

In the scrubbing tower 10 the gaseous effluent will flow counter-current or horizontally to the scrubbing fluid coming into intimate contact with one another. During contact heat will be transferred from the effluent to the scrubbing fluid. Additionally, the pollutants in the effluent will pass to the fluid. Thereafter, the cleansed and cooler effluent will be released from the top or opposite end of the scrubbing tower through output 16 and the hotter pollution carrying fluid will be collected in a basin 11 at the base of the scrubbing tower. Sufficient fluid is kept in the basin to provide a liquid seal between it and the scrubbing tower thus preventing the escape of gaseous effluent through the bottom of the scrubbing tower.

The heated, pollutant carrying, scrubbing fluid 18 is pumped by pump 19 through a conduit 17 into an insulated cleaning system 20 where the pollutants are removed through output 22. The cleaning system may employ filtration, sedimentation or other known cleaning techniques. A combination of sedimentation to remove the sulfur compounds which will precipitate rapidly and filtration to remove the other pollutants is preferable. The cleaning system is insulated to prevent heat loss from the fluid.

From the cleaning system 20 the still hot and cleansed fluid is pumped by pump 24 through pipe 23 into a flashing unit 30. A spray condenser 40 in the top of the flashing unit 30 keeps the top of the unit at a lower temperature than the hot fluid entering the bottom of the unit. This temperature differential causes a pressure differential between the top and bottom of the unit. When the fluid enters the bottom of the unit the pressure differential will cause it to flash into foam. Inlet means 32 is provided at the base of the tower 30 through which a foam inducing agent such as air or a surfactant can be introduced to prompt foam formation by the liquid. The foam will rise within the tower 30. When it has reached the top of the tower it is broken into its liquid and vapor components. We have found that a small amount of hexanol fed through input 34 can be used to break the foam.

The vapor component of the foam passes into a barometric leg spray condenser 40 where it is condensed into a liquid. If the vapor phase is water vapor, cool water is sprayed onto the vapor to condense it. If a scrubbing fluid other than water is being used, that same fluid to which some water has been added, can be used in the spray condenser. The condensed vapor and sprayed liquid are collected at the base of the barometric leg condenser 40 and piped into a catch pot 42 through pipe 41. The collected fluid is pumped by pump 46 through conduit 48 into a cooling tower 50. In the cooling tower the fluid is cooled mainly through the evaporation of some of the water it contains. Because this evaporation cooling will be minimal with high-boiling nonaqueous fluids, water must be added to them if such fluids are used as the scrubbing agent. Its heat having been transferred to the ambient air through the cooling tower, the cooled fluid is collected in a basin 52 at the base of the tower 50. From the basin, the fluid is pumped by pump 54 through pipe 56 to the spray condenser 40 for reuse. A make-up line 58 is provided to add fluid to the system when necessary.

The liquid phase is collected in the collector portion of the flashing unit 30 and conveyed into standpipe 36. It falls through the standpipe 36 onto a water wheel or turbine 60. The falling liquid propels the turbine which is connected to a generator (not shown) that produces electricity. After passing over the turbine the fluid is pumped by pump 61 through conduit 14 to the scrubbing tower 10 for reuse. A make-up line 15 is provided to add fluid to the system as required. A surge tank can be added to the return line to provide a more constant liquid flow.

We have found that this embodiment is particularly useful for flue gases from fossil fuel fired furnaces. The flue gas entering the scrubbing tower is at a temperature ranging upward from 250° F. and contains solid particles, sulfur compounds and $NO_x$ compounds. In the scrubbing tower these pollutants are removed by the scrubbing fluid and the flue gas is cooled to a temperature of 95° F.–100° F. when it leaves the tower. The scrubbing fluid collected at the base of the tower will have a temperature of 140° F. to 160° F. if water or a value near that of the entering flue gas if higher boiling point fluids are used. Little heat should be lost during the filtration process so the scrubbing fluid enters the flashing unit at approximately the same temperature. The fluid used in the spray condenser is at a temperature lower than 90° F. It is heated by the condensing vapor to less than 110° F., transferred to the cooling tower, and there cooled to below 90° F. The exact temperature it reaches is dependent upon the temperature and moisture content of the ambient air.

For two plants we have calculated that from 4% (for a low sulfur liquid fossil fuel fired steam generating plant of 500MW) to 15% (for a coal fired steam generating plant of 1000MW) of the flue gas waste heat can be recovered thereby increasing the overall generating capacity of the power plant by 1.8% to 10%.

Figure 2:
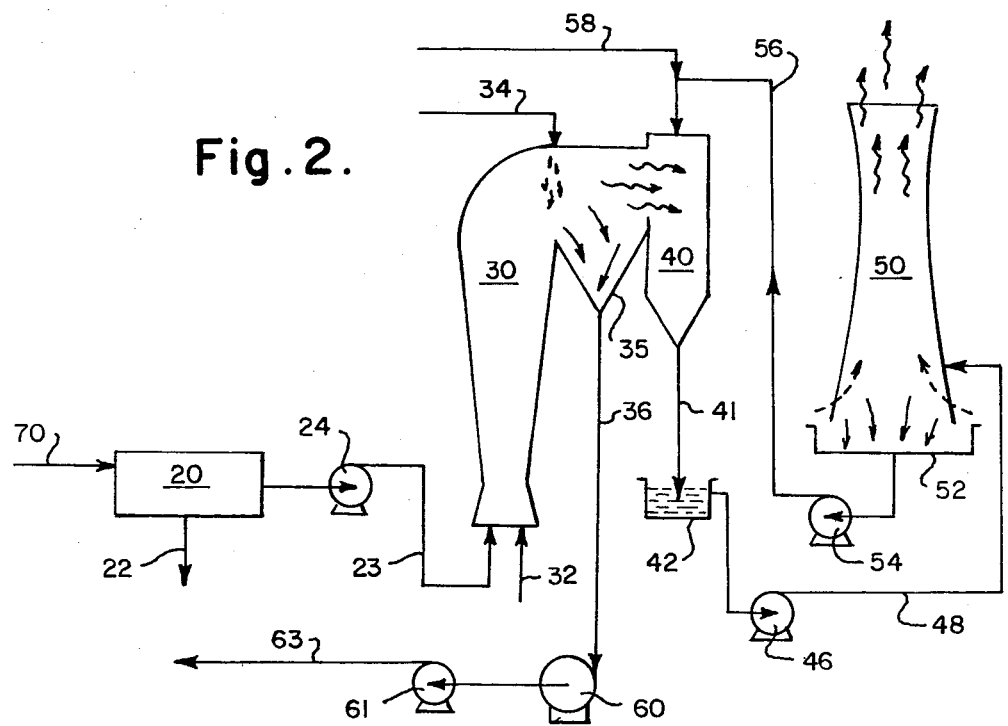
FIG. 2 is a flow diagram showing a present preferred method and apparatus for use with liquid effluents.

FIG. 2 illustrates an application of the invention to liquid effluents whose temperatures typically will be greater than 140° F. Here the effluent serves as the working fluid. The hot, liquid, polluted effluent is fed through input 70 into an insulated cleaning system 20 where the pollutants are removed. If the effluent does not contain an unacceptable level of pollutants the cleaning system can be bypassed. The cleaning system may employ filtration, sedimentation or other known cleaning techniques. These pollutants are expelled from the cleaning system for disposal through output 22. The cleaning system is insulated to prevent heat loss from the fluid.

In similar fashion the still hot and cleansed fluid is pumped through pipe 23 by pump 24 into flashing unit 30. As in the first embodiment a spray condenser 40 in the top of the flashing unit 30 keeps the top of the unit at a lower temperature than the hot fluid entering the bottom of the unit. This temperature differential causes a pressure differential between the top and bottom of the unit. When the fluid enters the bottom of the tower the pressure differential will cause it to flash into foam. Inlet means 32 is provided at the base of the unit 30 through which a foam inducing agent such as air or a surfactant can be introduced to prompt foam formation by the liquid. The foam rises within the unit 30. When it has reached the top the foam is broken into its liquid and vapor components. A breaking liquid can be fed through input 34 to break the foam.

The vapor phase of the foam is handled in the same fashion as in the first embodiment shown in FIG. 1. It is captured in a barometric leg spray condenser 40 from which it is conducted through conduit 41 into a catch pot 42 and then pumped by pump 46 through conduit 48 into cooling tower 50. Cooled fluid is collected in a basin 52 at the base of the tower 50. From the basin, the fluid is pumped by pump 54 through pipe 56 to the spray condenser 40 for reuse. A make-up line 58 is provided to add fluid to the system when necessary.

The liquid phase is conducted to standpipe 36 through which it falls. A water wheel or turbine 60 is provided at the base of standpipe 36 and propelled by the falling liquid. The turbine is connected to a generator (not shown) which produces electricity. After passing over the turbine the fluid is expelled by pump 61 through conduit 63.

Figure 3:
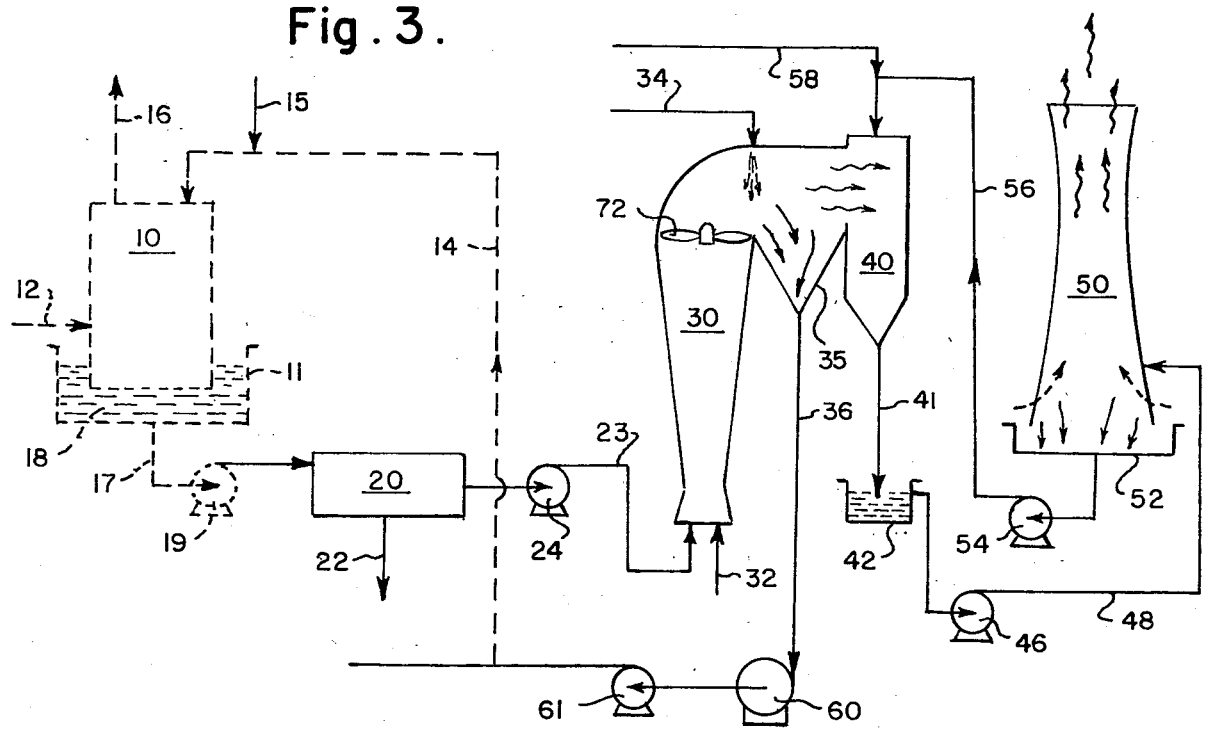
FIG. 3 is a flow diagram similar to those of FIGS. 1 and 2, but also having a second turbine located within the flashing unit.

In another embodiment of our invention shown in FIG. 3 a second turbine 72 is placed within the flashing unit and propelled by the moving foam. As in the previous embodiments the hot liquid effluent or the scrubbing fluid from the components shown in chain line is pumped by pump 24 into the flashing unit 30. As in the other embodiments a spray condenser 40 in the top of the flashing unit creates a pressure differential within the flashing unit. When the fluid enters the bottom of the unit it flashes into a foam. The foam advances toward the spray condenser thereby driving turbine 72. This turbine is preferably of the propeller type whose axis of rotation is in either a horizontal or vertical plane.

Figure 4:
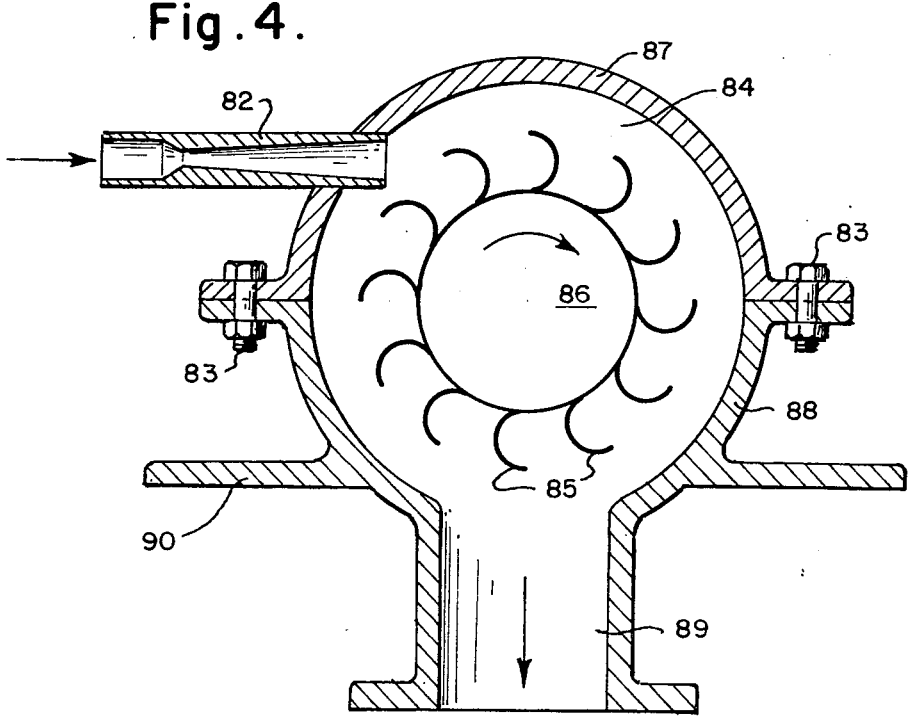
FIG. 4 is a cross-sectional view of a fourth embodiment in which a Pelton wheel type impulse turbine is driven by flashed material leaving the flashing unit.

The flashed foam can also drive a turbine located at the output of the flashing unit as shown in FIG. 4. In this embodiment the output of a convergent-divergent flashing unit 82 opens into an evacuated chamber 84 containing a Pelton wheel 86. The evacuated chamber is enclosed by upper turbine casing 87 and lower turbine casing 88 coupled by bolts 83 mounted on base 90. The turbine casing has a discharge extension 89 which is connected to a spray condenser vacuum system (not shown). Hot liquid is supplied to the flashing unit 82 at pressures higher than atmospheric pressure. As the fluid enters the unit 82, it is flashed into the evacuated chamber 84 which is maintained at lower than atmospheric pressures. The flashed liquid enters the evacuated chamber at high velocity increasing its kinetic energy and impulse immediately before impinging upon the buckets 85 of the Pelton wheel 86 and thereby transferring its moment to the wheel making it turn. The Pelton wheel is connected to a generator via a coupling and transmission (not shown). In this way the thermal energy of the hot fluid is converted into kinetic energy which causes the Pelton wheel to rotate and drive a generator. Finally, the flashed material flows out of the evacuated chamber 84 through the discharge extension 89 and into the spray condenser vacuum system (not shown).

Figure 5:
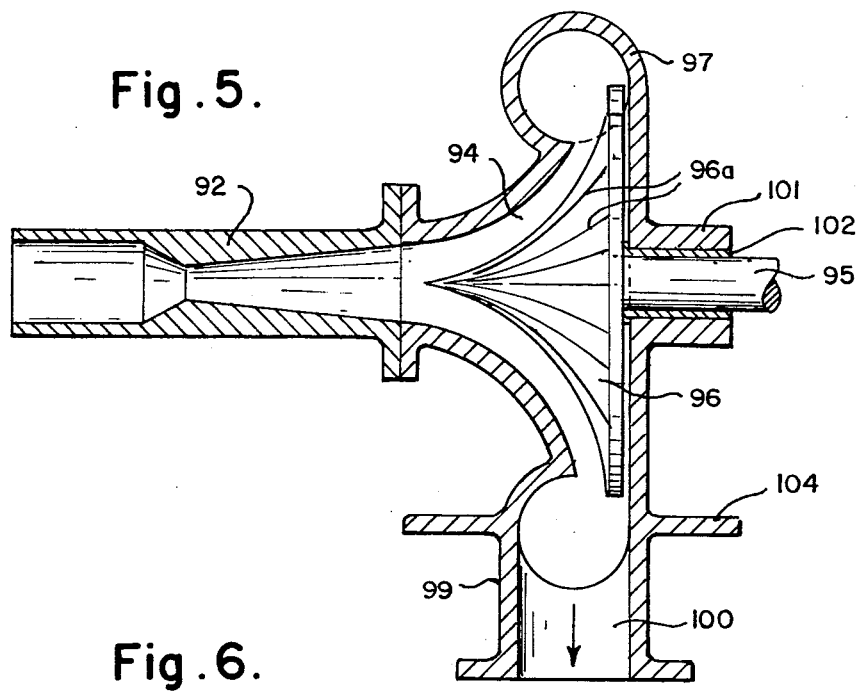
FIG. 5 is a cross-sectional view of a fifth embodiment wherein a different impulse turbine is driven by the escaping flashed fluid.

One can also use the flashed liquid to drive another type of impulse turbine. Referring to FIG. 5 a convergent-divergent flashing unit 92 opens into an evacuated chamber 94 formed by upper and lower casings 97 and 99. Lower casing 99 is sized to define a discharge area 100. A rotor 96 supported on shaft 95 is positioned in the evacuated chamber 94 opposite the flashing unit 92. The shaft 95 is supported at 101 and turns in bearing 102. The complete assembly is supported on base 104. Flashed material exits the flashing unit at a high velocity and impinges on the vanes 96a of the rotor 96 causing the rotor and shaft to turn. After striking the vanes 96a the flashed material then flows peripherally and tangentially to the rotor 96, through the discharge area 100 and into the spray condenser vacuum system (not shown).

Figure 6:
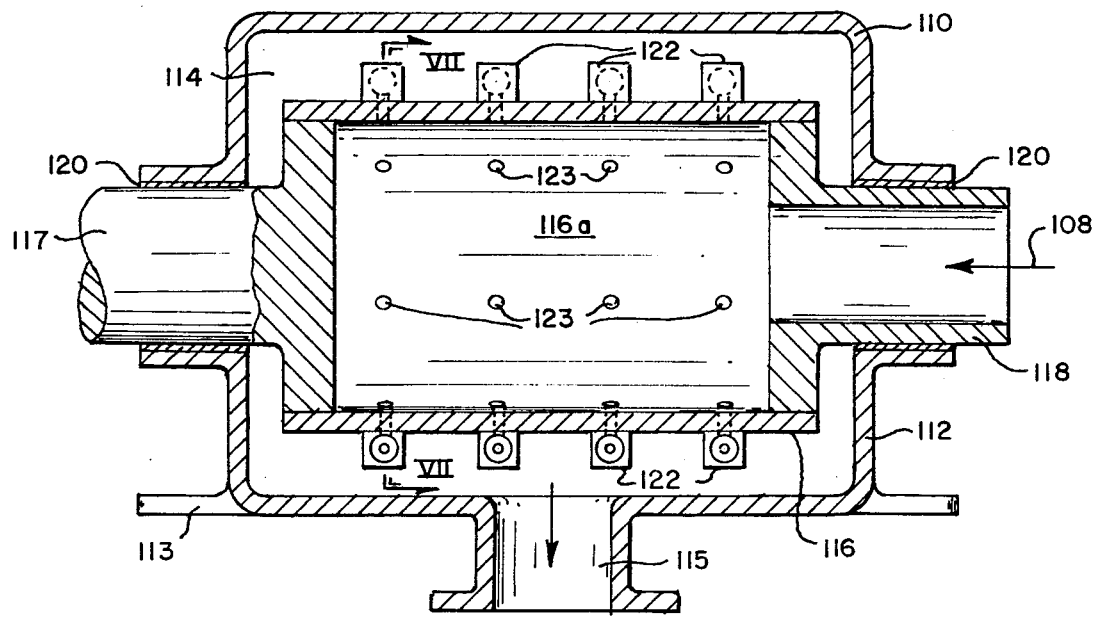
FIG. 6 is a cross sectional side view of a reaction turbine in which flashed fluid from a plurality of flashing units propels the turbine.
Figure 7:
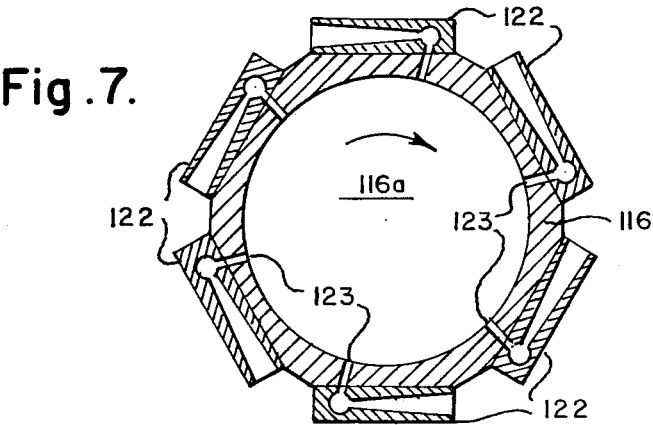
FIG. 7 is a cross sectional end view of the rotor portion of the reaction turbine of FIG. 6 taken on line VII.

A plurality of flashing units are used in a sixth embodiment of our invention to create a reaction turbine as shown in FIG. 6. Upper casing 110 and lower casing 112 with discharge 115 are connected together to define an evacuated chamber 114. The assembled casings rest on base 113. The assembled casings rest on base 113. A hollow rotor 116 is suspended within the evacuated chamber 114 by solid shaft 117 and hollow shaft 118. The shafts 117 and 118 rest on seals and bearings 120. A plurality of flashing units 122 are attached about the periphery of the hollow rotor 116 as shown in FIG. 7. Conduits 123 connect each flashing unit to the hollow core 116a of the rotor 116. The pressure in the rotor core 116a will be above atmospheric pressure while the pressure in chamber 114 is kept below atmospheric pressure by a spray condenser (not shown) connected to the unit at discharge 115. Hot liquid 108 enters the rotor core 116a through hollow shaft 118. The pressure differential between the core 116a and the evacuated chamber causes the fluid to flash through the flashing units. The flashing action causes an equal and opposite reaction making the rotor 116 and connected shafts 117 and 118 rotate. Solid shaft 117 is coupled to an electric generator (not shown) to generate electricity.

While we have shown and described a present preferred embodiment of the invention and have illustrated a present preferred method of practicing the same, it is to be distinctly understood that the invention is not limited thereto but may be otherwise variously embodied within the scope of the following claims.

We claim:

1. A method for concurrently recovering enthalpy and removing pollutants from a hot liquid industrial effluent comprising:
    a. cleansing the hot effluent to remove pollutants therefrom,
    b. conducting the effluent into a flashing unit having an inlet and an outlet and operating with a pressure differential between its inlet and outlet such that the differential will induce a flow of fluid within the flashing unit, c. flashing the effluent into a foam, and d. providing turbine means operably connected to the flashing unit such that a flow of the foam will propel the turbine.

2. A method of recovering enthaply from a hot gas comprising:

a. spraying the hot gas with a fluid to cool the gas and concurrently heat the liquid, b. collecting the heated fluid, c. conducting the fluid into a flashing unit having an inlet and an outlet and operating with a pressure differential between its inlet and its outlet such that the differential will induce flow within the unit, d. flashing the fluid into a foam, and e. providing turbine means operably connected to the flashing unit such that a flow of the foam will propel the turbine.

3. The method of claims 1 or 2 wherein the turbine means is a Pelton wheel turbine positioned at the output of the flashing unit.

4. The method of claims 1 or 2 wherein the turbine means is an impulse turbine positioned at the output of the flashing unit.

5. A method for concurrently recovering enthalpy and removing pollutants from a hot gaseous industrial effluent comprising:

a. spraying the hot effluent with a scrubbing fluid to entrap within the fluid pollutants from the effluent, b. collecting the scrubbing fluid, c. cleansing the entrapped pollutants from the scrubbing fluid, d. conducting the scrubbing fluid into a flashing unit having an inlet and an outlet and operating with a pressure differential between its inlet and its outlet such that the differential will induce flow within the flashing unit, e. flashing the scrubbing fluid into a foam, and f. providing turbine means operably connected to the flashing unit such that a flow of the foam will propel the turbine.

6. A method for concurrently recovering enthalpy and removing pollutants from a hot gaseous industrial effluent comprising:

a. spraying the hot effluent with a scrubbing fluid to entrap within the fluid pollutants from the effluent, b. collecting the scrubbing fluid, c. cleansing the entrapped pollutants from the scrubbing fluid, d. providing a reaction turbine means having (i) a rotor having a hollow core, (ii) a plurality of flashing units attached to the rotor about its periphery, (iii) a plurality of conduits connecting the flashing units to the hollow core, and (iv) a housing having an evacuated chamber maintained at a pressure below the pressure of the rotor core and sized to contain the rotor, (v) a hollow feed shaft attached to the rotor and inputting into the rotor core and rotatably mounted on the housing, and (vi) a drive shaft attached to the rotor opposite the feed shaft and rotatably mounted on the housing, e. conducting the fluid into the rotor core through the hollow shaft and into the flashing units through the conduits, and f. flashing the fluid in the flashing units into a foam thereby causing the rotor to turn.

7. A method for concurrently recovering enthalpy and removing pollutants from a hot liquid industrial effluent whose temperature is at least 140° F. comprising:

a. cleansing the hot effluent to remove pollutants therefrom, b. providing a reaction turbine means having (i) a rotor having a hollow core, (ii) a plurality of flashing units attached to the rotor about its periphery, (iii) a plurality of conduits connecting the flashing units to the hollow core, (iv) a housing having an evacuated chamber maintained at a pressure below the pressure of the rotor core and sized to contain the rotor, (v) a hollow feed shaft attached to the rotor and inputting into the rotor core and rotatably mounted on the housing, and (vi) a drive shaft attached to the rotor opposite the feed shaft and rotatably mounted on the housing, c. conducting the fluid into the rotor core through the hollow shaft and into the flashing units through the conduits, and d. flashing the fluid in the flashing units into a foam thereby causing the rotor to turn.

8. A method of recovering enthaply from a hot gas comprising:

a. spraying the hot gas with a liquid to cool the gas and concurrently heat the liquid, b. collecting the heated fluid, c. providing a reaction turbine means having (i) a rotor having a hollow core, (ii) a plurality of flashing units attached to the rotor about its periphery, (iii) a plurality of conduits connecting the flashing units to the hollow core, (iv) a housing haivng an evacuated chamber maintained at a pressure below the pressure of the rotor core and sized to contain the rotor, (v) a hollow feed shaft attached to the rotor and inputting into the rotor core and rotatably mounted on the housing, and (vi) a drive shaft attached to the rotor opposite the feed shaft and rotatably mounted on the housing, d. conducting the fluid into the rotor core through the hollow shaft and into the flashing units through the conduits, and e. flashing the fluid in the flashing units into a foam thereby causing the rotor to turn.

9. An apparatus for concurrently recovering enthalpy and removing pollutants from hot gaseous industrial effluents comprising:

a. a scrubbing tower having (i) an input means and an output means for receiving and expelling the effluent and (ii) an input means and output means for receiving and expelling a scrubbing agent, b. a cleaning unit for removing pollutants from the scrubbing agent which is expelled from the scrubbing tower, c. conduit means between the scrubbing tower and the cleaning unit for conducting expelled scrubbing agent from the srubbing tower to the cleaning unit, d. a flashing unit operating with a pressure differential between its inlet and outlet in which the scrubbing agent can be formed into a foam, allowed to move, and separated into its liquid and vapor phases and having means for separately expelling the liquid and vapor phases, e. conduit means between the scrubbing unit and the flashing unit for conducting the scrubbing agent from the cleaning unit to the flashing unit, f. turbine means located within the flashing unit so that movement of the foam will drive the turbine, g. conduit means between the flashing unit and scrubbing tower for conducting the liquid phase to the scrubbing tower, and h. means for collecting the vapor phase

10. An apparatus for recovering energy and removing pollutants from hot liquid industrial effluents comprising:

a. a cleaning unit for removing pollutants from the effluent, b. a flashing unit operating with a pressure differential between its inlet and outlet in which the effluent can be formed into a foam, allowed to rise, and separated into its liquid and vapor phases and having means for separately expelling the liquid and vapor phases;

c. conduit means between the cleaning unit and flashing unit for conducting the effluent from the cleaning unit to the flashing unit, d. turbine means located within the flashing unit so that movement of the foam will drive the turbine, e. conduit means attached to the flashing unit for expelling the liquid phase; and f. means for collecting the vapor phase.

11. The apparatus of claim 9 or 10 wherein the means for collecting the vapor phase is a barometric leg spray condenser.

12. The apparatus of claim 11 also comprising:

a. cooling tower;

b. first conduit means between the barometric leg spray condenser and the cooling tower; and c. second conduit means between the cooling tower and the spray condenser for conducting fluid from the cooling tower to the spray condenser.

13. The apparatus of claim 9 or 10 wherein the flashing unit has an internal configuration of a convergent-divergent nozzle.

* * * * *